US009481333B2

(12) United States Patent
Lee et al.

(10) Patent No.: US 9,481,333 B2
(45) Date of Patent: Nov. 1, 2016

(54) BUMPER BACK BEAM FOR VEHICLE

(71) Applicants: Hyundai Motor Company, Seoul (KR); LG Hausys, Ltd., Seoul (KR)

(72) Inventors: Seung Mok Lee, Whasung-Si (KR); Phil Jung Jeong, Whasung-Si (KR); Hyun Gyung Kim, Whasung-Si (KR); Dong Eun Cha, Whasung-Si (KR); Hee June Kim, Whasung-Si (KR); Yong Kil Kil, Whasung-Si (KR); Tae Hwa Lee, Whasung-Si (KR); Kang Hyun Song, Whasung-Si (KR)

(73) Assignees: Hyundai Motor Company, Seoul (KR); LG Hausys, Ltd., Seoul (KR)

( * ) Notice: Subject to any disclaimer, the term of this patent is extended or adjusted under 35 U.S.C. 154(b) by 60 days.

(21) Appl. No.: 14/535,626

(22) Filed: Nov. 7, 2014

(65) Prior Publication Data

US 2015/0367795 A1    Dec. 24, 2015

(30) Foreign Application Priority Data

Jun. 18, 2014 (KR) .......................... 10-2014-0074492

(51) Int. Cl.
*B60R 19/03* (2006.01)
*B60R 19/18* (2006.01)

(52) U.S. Cl.
CPC ........ *B60R 19/18* (2013.01); *B60R 2019/1833* (2013.01); *B60R 2019/1846* (2013.01); *B60R 2019/1853* (2013.01)

(58) Field of Classification Search
USPC .......................... 293/120, 149, 151, 152, 153
See application file for complete search history.

(56) References Cited

U.S. PATENT DOCUMENTS

| | | | | |
|---|---|---|---|---|
| 5,005,887 A | * | 4/1991 | Kelman ................. | B60R 19/24 293/109 |
| 2012/0141764 A1 | * | 6/2012 | Lee ........................ | B60R 19/03 428/297.4 |
| 2012/0280536 A1 | * | 11/2012 | Malek ................... | B29C 45/164 296/193.09 |
| 2015/0115631 A1 | * | 4/2015 | Alavandi ............... | B60R 19/04 293/120 |
| 2015/0353042 A1 | * | 12/2015 | Lee ........................ | B60R 19/18 293/142 |
| 2016/0096496 A1 | * | 4/2016 | Hardy .................... | B60R 19/04 296/187.1 |
| 2016/0114747 A1 | * | 4/2016 | Ishitobi ................. | B60R 19/18 293/120 |
| 2016/0121827 A1 | * | 5/2016 | Yabu ...................... | B60R 19/03 293/120 |

FOREIGN PATENT DOCUMENTS

| | | |
|---|---|---|
| JP | 6-63446 U | 9/1994 |
| JP | 2007290585 A * | 11/2007 |
| JP | 2010-76476 A | 4/2010 |
| KR | 10-2011-0013602 A | 2/2011 |
| KR | 10-1031108 B1 | 4/2011 |

* cited by examiner

*Primary Examiner* — H Gutman
(74) *Attorney, Agent, or Firm* — Morgan, Lewis & Bockius LLP

(57) ABSTRACT

A bumper back beam for a vehicle may include side portions connected to a vehicle body and formed of general plastic on both sides and an intermediate portion connecting the side portions on both sides and formed of high-strength plastic and a predetermined section, both ends of which encroach into the side portions to form overlap sections.

8 Claims, 4 Drawing Sheets

BUMPER BACK BEAM FOR VEHICLE

CROSS-REFERENCE TO RELATED APPLICATION

The present application claims priority to Korean Patent Application No. 10-2014-0074492, filed Jun. 18, 2014, the entire contents of which is incorporated herein for all purposes by this reference.

BACKGROUND OF THE INVENTION

1. Field of the Invention

The present invention relates to a bumper back beam for a vehicle, and more particularly, to a bumper back beam for a vehicle including of a side portion, both sides of which are connected to a vehicle body and an intermediate portion for connecting the side portion on both sides, which are formed of different materials.

2. Description of Related Art

Generally, a bumper back beam is installed on the front part and the rear part of a vehicle so as to protect a vehicle body, and further a passenger, with respect to a collision.

According to a related art, a back beam that is made of steel has been used to ensure sufficient rigidity thereof; however, it is a recent trend to mainly use a back beam that is made of a composite material of plastic and steel, or plastic of different materials having different strength. This trend is due to the problems of increasing weight and deterioration of fuel efficiency.

Here, as shown in FIG. 1, the back beam formed of different plastic materials is comprised of a side portion 1, both sides of which are connected to a vehicle body and an intermediate portion 2 for connecting the side portion 1 on both sides are made of high strength plastic and general-strength plastic, respectively.

The side portion 1 is a crash box to be connected to a side member consisting of a vehicle body, through which impact energy is transferred toward a vehicle body while its outer form is collapsed by a load produced when the vehicle collides, and the intermediate portion 2 corresponds to a rail portion, through which the impact energy is absorbed through self-deformation when a vehicle collides.

The intermediate portion 2 may preferably be formed of high-strength plastic so as to ensure sufficient rigidity and the side portion 1 may preferably be made of general-strength plastic so as to easily transfer impact energy toward a vehicle body.

The back beam formed of different materials such as high-strength plastic and general plastic as described above may be configured to sufficiently ensure the rigidity, thereby safely protecting a vehicle body and a passenger when a vehicle collides.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bumper back beam for a vehicle including an intermediate portion formed of high-strength plastic and a side portion on both ends made of general plastic, in which both ends of the intermediate portion is overlapped onto the side portion at a predetermined section so as to ensure sufficient rigidity, thereby more safely protecting a vehicle body and passenger when a vehicle collides.

Various aspects of the present invention are additionally directed to providing a bumper back beam for a vehicle, in which a portion where an intermediate portion and a side portion are connected to be overlapped is formed as a box structure so as to ensure the additional rigidity and a plurality of holes and bent grooves are formed through the box portion where the side portion and the intermediate portion are overlapped so as to induce the buckling of the side portion with respect to the collision load, thereby absorbing and transferring impact energy toward a vehicle body more easily.

According to various aspects of the present invention, a bumper back beam for a vehicle may include side portions connected to a vehicle body and formed of general plastic on both sides, and an intermediate portion connecting the side portions on both sides and formed of high-strength plastic and a predetermined section of both ends of which encroach into the side portions to form overlap sections.

Each overlap portion may be a box portion having a predetermined space therein together with each side portion.

A length of each overlap section in a left/right direction may exceed at least 5% or more of a length of the side portion in the left/right direction and may not exceed a maximum of 50%.

A plurality of through-holes may be formed passing through a side wall of the box portion so as to induce buckling of the box portion with respect to a collision load.

Bent grooves may be continuously formed on a side surface forming the box portion at each side portion, which induce buckling of the bent portion with respect to a collision load.

A total sectional area of the through-holes may be 5% to 50% of a sectional area of the side wall.

High-strength plastic which forms the intermediate portion may be a composite material combined with glass fiber, polypropylene, and polyamide resin.

The general plastic forming the side portions may be the same material as any one of resins used in forming the high-strength plastic.

The side portion may be connected to a side member of a vehicle body.

According to various aspects of the present invention, a bumper back beam for a vehicle may include a portion required of ensuring rigidity formed of high-strength plastic material and portions of the bumper back beam for transmitting impact energy toward a vehicle body formed of general plastic material having weak strength as compared to the high-strength plastic material, wherein the high-strength plastic material may be connected to the general-plastic materials to be overlapped at a predetermined section.

The overlapped predetermined section of the high-strength plastic material onto the general plastic material may be formed as a box structure in order to ensure the rigidity.

A plurality of through-holes may be formed to induce buckling of the box portion with respect to a collision load or bent grooves may be continuously formed on the box portion.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
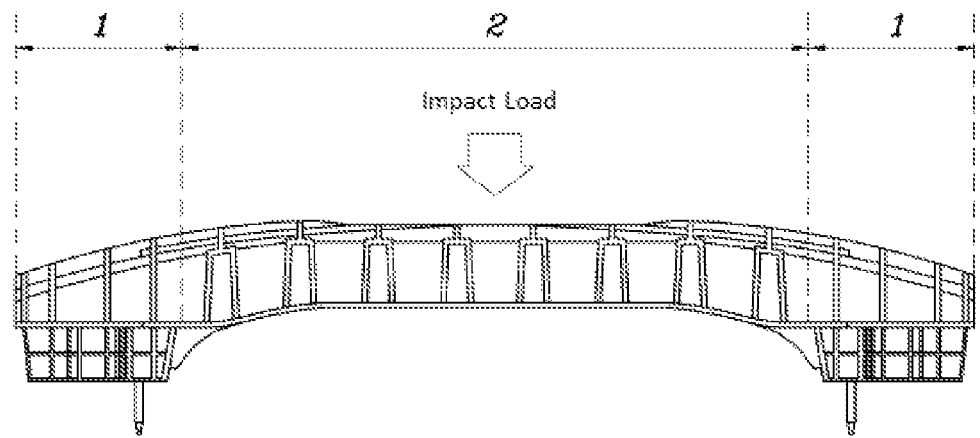
FIG. 1 is a top view illustrating a back beam formed of general different plastic materials in the related art.
Figure 2:
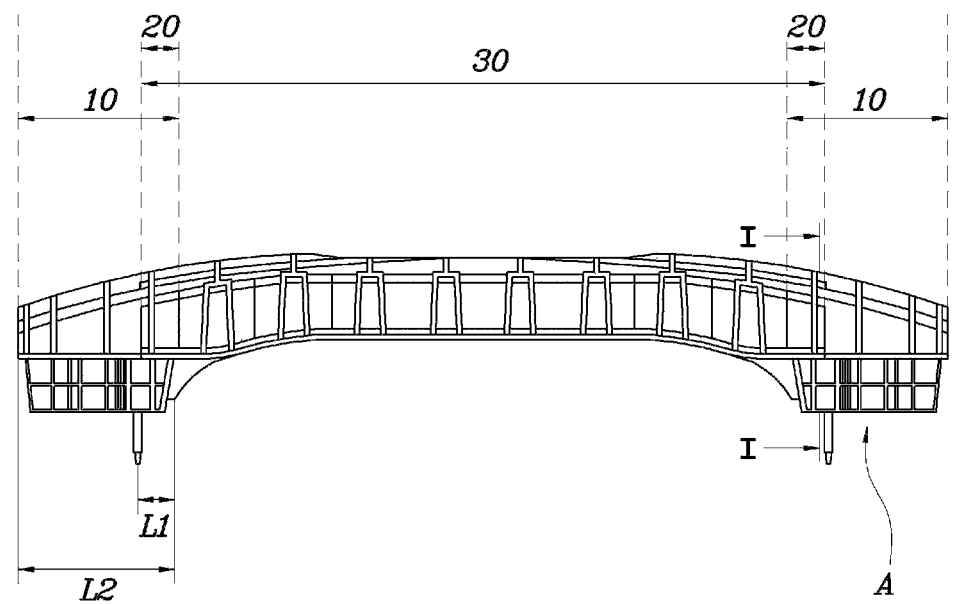
FIG. 2 is a top view illustrating an exemplary back beam formed of different plastic materials according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A bumper back beam for a vehicle according to various embodiments of the present invention, as shown in FIG. 2 and FIGS. 4 to 6, may include a side portion 10 that is connected to a vehicle body and formed of general plastic on both sides, and an intermediate portion 30 which connects the side portions 10 on both sides and formed of high-strength plastic and the predetermined section of both ends of which encroaches into the side portions 10 to form an overlap section 20.

The side portion 10, which is generally called as a crash box, is connected to a side member of a vehicle body and transfers impact energy toward the vehicle body while its outer form is collapsed by the load produced when a vehicle collides.

The intermediate portion 30 corresponds to a rail portion and absorbs the impact energy through self-deformation when a vehicle collides.

The intermediate portion 30 may be formed of high-strength plastic so as to ensure sufficient rigidity and the side portion 10 may be formed of general-strength plastic so as to easily transfer impact energy toward a vehicle body.

The intermediate portion 30 may be formed of high-strength plastic so as to ensure sufficient rigidity where the high-strength plastic includes composite material combined with glass fiber, polypropylene (PP), and polyamide resin, but it is not limited thereto.

Further, the side portion 10 may be formed using general plastic having a relatively weak strength as compared to the high-strength plastic, wherein the general plastic may preferably be formed using the same material as any one of resins used in forming the high-strength plastic, and thus the side portion 10 and the intermediate portion 30 may be easily connected integrally.

Meanwhile, according to the back beam of the present invention, the predetermined section of both ends of the intermediate portion 30 formed of high-strength plastic encroaches into the side portions 10 on both sides, respectively, which are formed of general plastic to form an overlap section, that is, the high-strength plastic is overlapped on the side portions 10 having weak strength so as to form an overlap region 20 and through this configuration the rigidity of the side portions 10 can be improved, thereby removing a phenomenon where a rupture easily occurs on a boundary region between the side portion 10 and the intermediate portion 30 with respect to collision load.

The length L1 in a left/right direction of the overlap section 20 may exceed at least 5% or more of the length L2 in a left/right direction of the side portion 10 and may not exceed maximum 50% thereof.

Figure 3A:
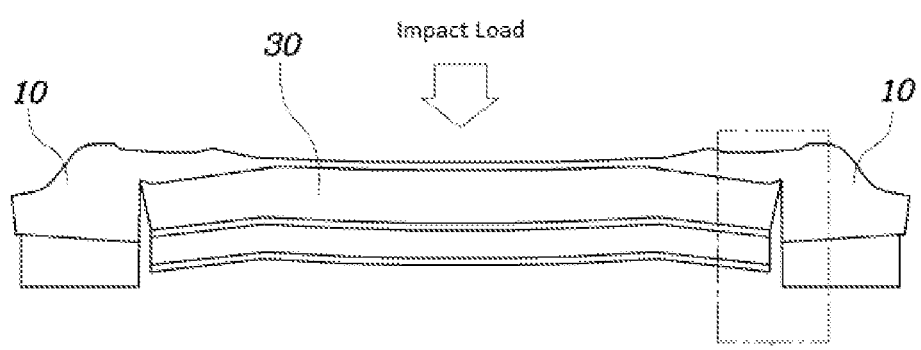
FIG. 3A and FIG. 3B are views illustrating a rupture produced at a boundary region between a side portion and an intermediate portion of the exemplary back beam formed of different plastic materials according to the present invention.
Figure 3B:
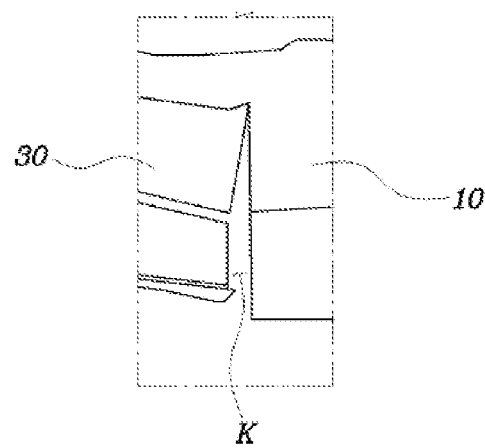

If the length L1 is 5% or less of the length L2, sufficient rigidity is not ensured at the boundary region of the side portion 10 and the intermediate portion 30 and thus the boundary region of the side portion 10 and the intermediate portion 30 is ruptured as marked by letter K in FIG. 3B with respect to the collision load.

On the contrary, if the length L1 exceeds 50% of the length L2, the rigidity of the side portion 10 is excessively increased and in this case, the performance for transferring the collision energy toward a vehicle body is decreased, thereby not protecting a vehicle and a passenger more safely.

According to the present invention, the length L1 in a left/right direction of the overlap section 20 may preferably be 5% to 50% of the length L2 in a left/right direction of the side portion 10 in which it may preferably overlap by about 10 mm.

Figure 4:
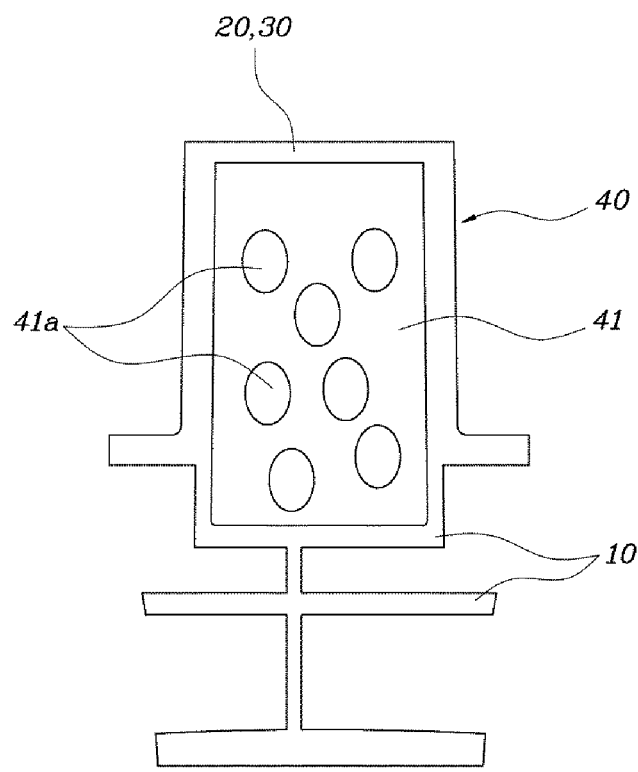
FIG. 4 is a cross-sectional view taken along line I-I of FIG. 2.
Figure 5:
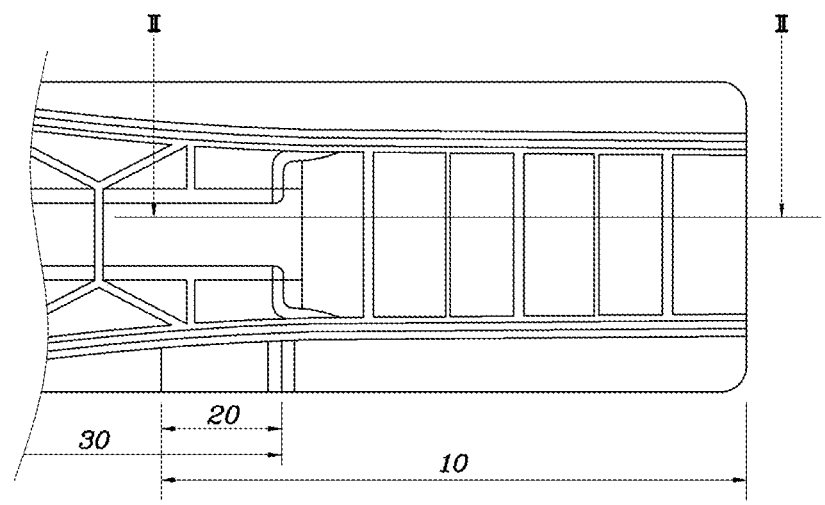
FIG. 5 is a view illustrating the exemplary back beam formed of different plastic materials, which is shown from A direction in FIG. 2.
Figure 6:
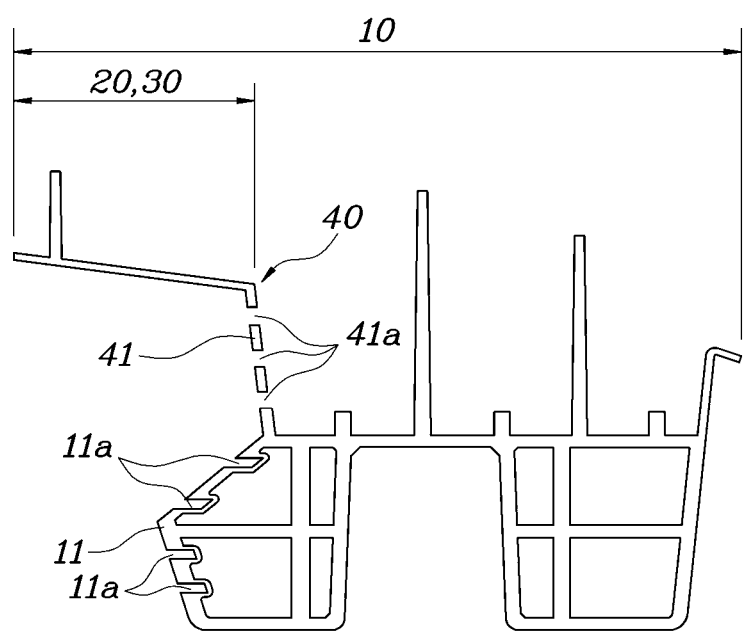
FIG. 6 is a cross-sectional view taken along line II-II of FIG. 5.

Here, the overlap section 20 is formed as a box portion 40 having a predetermined space therein so as to ensure additional rigidity, as shown in a sectional view of FIG. 4.

That is, the box portion 40 is formed by connecting the side portion 10 and the intermediate portion 30 to each other.

A plurality of through-holes 41a are formed through a side wall 41 consisting of the box portion 40 so as to induce the buckling of the box portion 40 with respect to the collision load.

The side wall 41 of the box portion 40 is a wall surface positioned on the edge of the left and right sides of the box portion 40.

A total sectional area of the through-holes 41a may be 5% to 50% of a sectional area of the side wall 41 where if it is 5% or less, the box portion 40 is not easily buckled with respect to the collision load thereby to efficiently absorb the collision energy, on the contrary, if it exceeds 50%, the rigidity of the box portion 40 is not sufficiently ensured thereby to easily break the box portion 40. Accordingly, in order to prevent this breaking, a total sectional area of the through-holes 41a may be 10% to 30% of a sectional area of the side wall 41 of the box portion 40.

Further, a plurality of bent grooves 11a are formed continuously on a side surface 11 forming the box portion 40 at the side portion 10, which induce the buckling with respect to the collision load.

As described above, according to the back beam for a vehicle of various embodiments of the present invention, the intermediate portion 30 formed of different plastic materials, namely high-strength plastic material and the side portion 10 formed of general plastic material on both sides are integrally connected and thus its weight is lighter and fuel efficiency is improved as compared to the back beam formed of steel or composite material of steel and plastic.

Further, with respect to the bumper back beam for a vehicle formed of different plastic materials according to various embodiments of the present invention, both ends of the intermediate portion 30 formed of high-strength plastic are overlapped on the side portion 10 formed of general-plastic at a predetermined section, and thus sufficient rigidity can be ensured at the connection portion of the side portion 10 and the intermediate portion 30, thereby removing a phenomenon where a boundary region of the side portion 10 and the intermediate portion 30 is easily broken with respect to the collision load and as a result, protecting a vehicle and a passenger more safely.

Further, a back beam according to various embodiments of the present invention is configured such that a portion where the side portion 10 and the intermediate portion 30 are overlapped and are connected is formed in a box structure, thereby aiming to ensure the additional rigidity, and a plurality of through-holes 41a and/or bent grooves 11a are formed on a box portion 40 that the side portion 10 and the intermediate portion 30 is overlapped so as to induce the buckling of the side portion 10 with respect to the collision load, thereby efficiently absorbing the collision energy and easily transferring the collision energy toward a vehicle body.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper back beam for a vehicle comprising:
   side portions connected to a vehicle body and formed of general plastic on both sides thereof; and
   an intermediate portion connecting the side portions on both sides thereof and formed of high-strength plastic and a predetermined section, both ends of which encroach into the side portions to form overlap sections having a hollow space enclosed by the side portion and the intermediate portion,
   wherein the side portion is connected to a side member of the vehicle body.

2. The bumper back beam for the vehicle of claim 1, wherein each overlap section is a box portion having a predetermined space therein together with each side portion.

3. The bumper back beam for the vehicle of claim 1, wherein a length of each overlap section in a left/right direction exceeds at least 5% or more of a length of each side portion in the left/right direction and does not exceed a maximum of 50%.

4. The bumper back beam for the vehicle of claim 2, wherein a plurality of through-holes are formed passing through a side wall of the box portion so as to induce buckling of the box portion with respect to a collision load.

5. The bumper back beam for the vehicle of claim 2, wherein bent grooves are continuously formed on a side surface forming the box portion at each side portion, which induce buckling of the box portion with respect to a collision load.

6. The bumper back beam for the vehicle of claim 4, wherein a total sectional area of the through-holes is 5% to 50% of a sectional area of the side wall.

7. The bumper back beam for the vehicle of claim 1, wherein the high-strength plastic which forms the intermediate portion is composite material combined with glass fiber, polypropylene (PP), and polyamide resin.

8. The bumper back beam for the vehicle of claim 1, wherein the general plastic forming the side portions is the same material as any one of resins used in forming the high-strength plastic.

* * * * *